United States Patent [19]

Stephenson

[11] 4,378,574

[45] Mar. 29, 1983

[54] DIGITAL DATA RECORDER AND METHOD

[75] Inventor: Edward A. Stephenson, Suquamish, Wash.

[73] Assignee: Sundstrand Data Control, Inc., Redmond, Wash.

[21] Appl. No.: 162,886

[22] Filed: Jun. 25, 1980

[51] Int. Cl.$^3$ .......................... G11B 15/18; G11B 5/00
[52] U.S. Cl. .......................................... 360/71; 360/6a
[58] Field of Search ........................ 360/5, 6, 7, 52, 71

[56] References Cited

U.S. PATENT DOCUMENTS

| | | | |
|---|---|---|---|
| 3,461,429 | 8/1969 | Graya | 360/5 |
| 3,685,031 | 8/1972 | Cook | 360/32 |
| 3,792,445 | 2/1974 | Bucks et al. | 360/6 |
| 3,855,617 | 12/1974 | Jankowski et al. | 360/32 |
| 4,012,784 | 3/1977 | Murphy et al. | 360/5 |
| 4,084,151 | 4/1978 | Penner | 360/6 |

OTHER PUBLICATIONS

"Triggering Digital Seismograph Utilizing by Processor with Memory for Preserving First-Motion Information"—W. M. Adams—Paper presented at The Hague, Jun. 1976.

*Primary Examiner*—Vincent P. Canney
*Attorney, Agent, or Firm*—Wegner, McCord, Wood & Dalton

[57] ABSTRACT

A digital data recorder has a microprocessor control which directs data to the read/write transducer and actuates the tape drive. The recorder accepts data in serial digital form and has an analog-to-digital converter-multiplexer which receives analog data and adapts it for digital recording. Data is read from the tape through an output connector to one of several retrieving devices. An identifying input to the microprocessor from the retrieving device provides for control of the read transducer and the tape drive to direct the appropriate data to the retrieving device.

5 Claims, 6 Drawing Figures

DIGITAL DATA RECORDER AND METHOD

This invention is concerned with a digital data recorder and more particularly with a microprocessor controlled recorder having the capability of receiving data in differing formats and of reading the data to retrieval equipment of different types.

This application is related to Eason et al Ser. No. 162,894 filed contemporaneously herewith.

The continuous recording of multi-parameter data is often required. For example, commercial aircraft are required by the FAA to have a recorder for a variety of operating parameters such as altitude, pitch angle, air speed, engine conditions, etc. Specifications for the recording of the required data have been developed by Aeronautical Radio Inc. (ARINC) a corporation owned by airlines and other interested parties which formulates standards to promote compatibility in the design and operation of aircraft and related equipment. The data recorders for commercial aircraft presently being manufactured and for those to be manufactured in the next few years operate with an input of serial digital data generated by a flight data acquisition unit on the aircraft. The characteristics for the recording system are found in ARINC specifications 573 and 717. Earlier aircraft, many of which are still operating, have recorders which receive continuous analog data in accordance with ARINC 542.

The recording apparatus and method disclosed herein are particularly designed to provide a digital flight data recorder which is compatible with and satisfies all three ARINC characteristics. Many features of the invention may, of course, be used in recorders for other types of data.

One feature of the invention is the provision of a digital data tape recorder having a read/write transducer and drive means for the recording tape which has a microprocessor control, a data register for receiving incoming digital data and means responsive to the microprocessor for directing data from the register to the transducer and for actuating the tape drive for recording the data on the tape Another feature is that the recorder has an output connector to which a means for retrieving the recorded information is connected. The retrieving means provides a control input to the microprocessor for operating the read transducer and the tape drive.

A further feature is that the recorder may receive continuous analog data and is provided with an analog-to-digital converter and data multiplexer for delivering serial digital data to the date register.

Yet another feature is the method of operating the recorder with a microprocessor program having alternate operating modes, one for recording of data and the other for reading data to a retrieval unit which provides a control input to the microprocessor.

Further features and advantages of the invention will readily be apparent from the following specification and from the drawings, in which:

Figure 1:
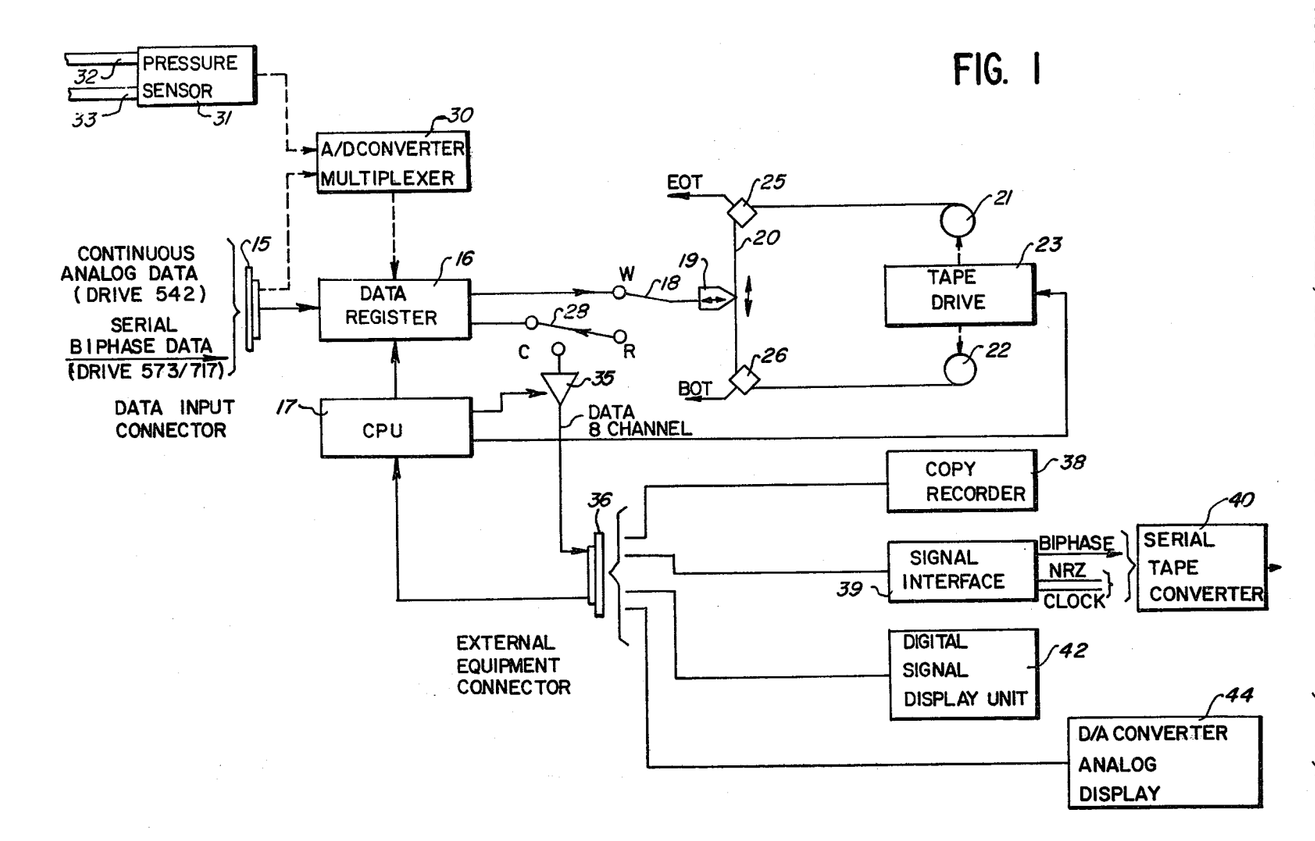
FIG. 1 is a diagrammatic block diagram of the recorder.

The recorder is shown diagrammatically in simplified form in FIG. 1. Features unrelated to the claims presented herein are omitted. Further detail regarding the recording and verification of the digital data is disclosed in the aforementioned Eason et al application and reference may be made thereto to supplement this disclosure. The invention will be described in the context of recording aircraft flight data. It will be understood that many features of the invention may be utilized in the recording of other types of data.

In the system of FIG. 1, a data input connector 15 provides for the connection of the recorder with a data source as a flight data acquisition unit (not shown) which provides serial bi-phase digital data in accordance with ARINC 573/717. The data is directed from the input connector to a data handling apparatus including a data register 16 under the control of a microprocessor or CPU 17. Data from the register is connected through read/write switch 18 to a read/write transducer 19 associated with recording tape 20. The tape is moved between reels 21, 22 by tape drive 23. The tape passes through sensors 25, 26 which provide end of tape (EOT) and beginning of tape (BOT) signals to CPU 17, as will appear. The tape typically has multiple recording tracks. The designations "end " and "beginning" of tape are for identification. Recording and retrieval can be carried out with the tape moving in either direction.

The data is preferably recorded in incremental blocks. As a part of the recording operation, a previously recorded data block is read and compared with the data as recorded in register 16, to verify the proper operation of the system. Switch 18 couples the data signal from transducer 19 through switch 28 to the data register 16. A further discussion of these functions is found in the Eason et al application.

In the event the recorder is to be used in an aircraft which collects flight data in continuous analog form (ARINC 542) an adapter 30 is provided. The adapter includes an analog-to-digital converter and a time multiplexer so that the output directed to data register 16 is serial digital data of the character defined by ARINC 573/717.

For an aircraft having pneumatic altitude and airspeed systems, a pressure sensor 31 is provided. Pitot and static air pressures are directed to the pressure sensor 31 through tubular connectors 32, 33. The pressure sensor generates analog electric signals representing the pneumatic pressures, and the electrical signals are connected to adapter 30 for incorporation in the digital data signal to register 16.

The recorder provides for the reading of recorded data to accommodate various types of data retrieval equipment. Transducer 19 is connected through read/write switch 18 in the read mode (R) and through switch 28 in the copy mode (C) with a data amplifier 35 which directs the amplified data signals to an external equipment connector 36. Switches 18, 28 and amplifier 35 are controlled by the CPU 17 as will be described below.

Different types of data retrieval equipment are used depending on the nature of the application and the operating requirements for the aircraft and the data recorder.

A copy recorder 38 may be utilized to copy all of the data tracks of tape 20 simultaneously, without removing the recorder from the aircraft. For example, in the system further described in the co-pending Eason et al application, data from an eight track tape representing twenty-five hours of aircraft operation may be retrieved by a multi-track copy recorder in less than half an hour.

An eight channel amplifier 35 is used and the tape is run only once.

In another option a signal interface unit 39 is utilized which has outputs either in the bi-phase digital format or of a nonreturn-to-zero (NRZ) format and clock signal. Either of these signals may be connected with a serial tape converter which decodes the multiplexed data for subsequent use. In this format a single track of data is read at one time. This requires a much longer time to transcribe the tape than with the copy recorder 38 and is typically utilized when the flight data recorder can be removed from the aircraft.

A digital signal display unit 42 may be connected with the data recorder to provide a digital display of a single selected data parameter. This retrieval device may be utilized with the recorder on the aircraft and is particularly suited for observing data as it is being recorded, with the aircraft or its controls operating, for verification of the recorder operation or calibration.

A digital to analog converter and analog display 44 may be utilized to extract one or more parameters from the recorded data and to display the selected parameter in analog form, as on a strip chart. This device may also be used with the recorder on the aircraft for quick analysis of the selected parameters, without the need for reviewing all of the recorded data.

Each of the retrieval devices provides for a control signal input to CPU 17 to select the desired tape drive and data transmission conditions. These control signals may be generated by circuits built into the retrieval device or may be provided by operator manipulation of controls on the device. For example, copy recorder 38 will always copy eight tracks of recorded information simultaneously. Accordingly, this condition control may be built into the unit. The digital signal display unit 42 and the analog display 44 may provide for operator selection of the track to be read and tape drive direction.

FIGS. 2-5 are simplified flow charts for programs which illustrate the general operation of the data recorder. Many of the detailed procedures and tests desirable for a commercial product are not shown as they are not a part of the invention and their inclusion would unnecessarily complicate the disclosure.

Figure 2:
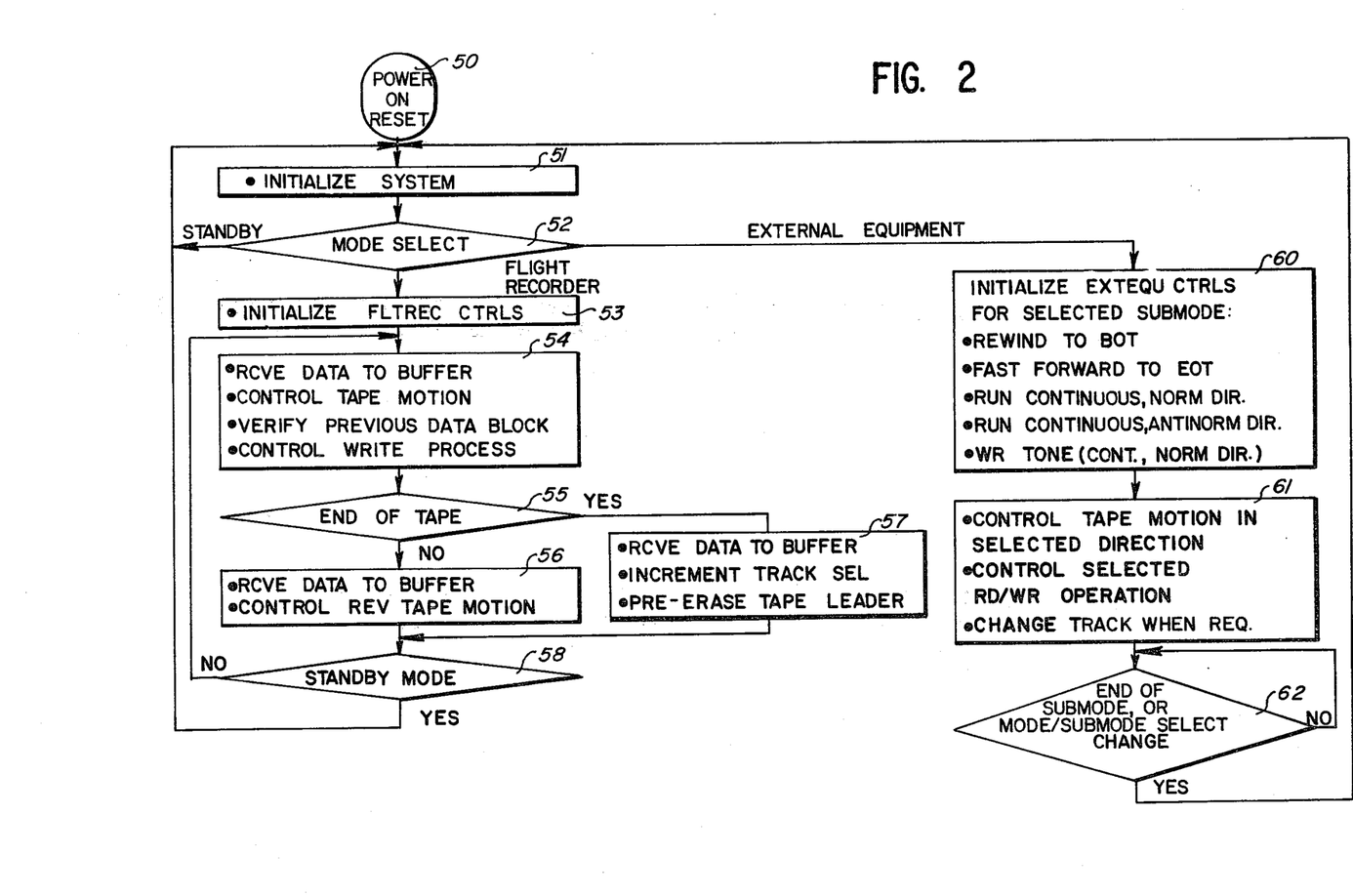
FIGS. 2, 3, 4A, 4B and 5 are functional flow charts for the microprocessor.

FIG. 2 provides a summary of the three principal modes of operation of the recording system. When power is turned on or the system reset at 50, the various circuits and controls are initialized, step 51. A mode selection is made at step 52 among a standby mode, flight recording mode and an external equipment mode. In the standby mode the program returns to step 51 and this loop is continued until another operating mode is selected.

In the flight recording mode the flight record controls are initialized at 53. Step 54 identifies the principal functions performed during recording, including the reception of data, control of tape motion, data verification and data writing to the tape. The Eason et al application discusses the data circuits and recording and verification programs in detail. At step 55 a check is made for an end of tape signal. In its absence data reception continues and the tape motion is reversed in preparation for the recording of the next data block, step 56. If the end of the tape has been reached, the program proceeds to step 57 in which the track selection is incremented and a section of tape pre-erased while data continues to be received in the data register. At step 58 a check is made for standby mode. In its absence the program returns to step 54. If the standby mode has been selected, the program returns to step 51.

In the external equipment operating mode, the program proceeds from mode selection, step 52, to step 60. The external equipment controls are initialized for the submode which is selected by the control information coupled to CPU 17 from the retrieval apparatus which is being used. These operations may include rewinding tape 20 to the BOT position, winding the tape in the forward direction to the EOT condition, continuous running in either the normal or the antinormal direction and writing of a tone as a test or a tape position marker. These functions are specifically implemented at step 61, including controlling the tape (start and stop) motion and selected direction. Concurrently read and write operations are performed with control of transducer 19, amplifier 35 and actuation of switches 18 and 28. Tape track selection is changed as required. At step 62 a determination is made whether a particular submode has been completed of if there has been a change in selection of a mode or submode. The operations initiated in step 60 and 61 continue until a change is required at which point the program returns to step 51.

Figure 3:
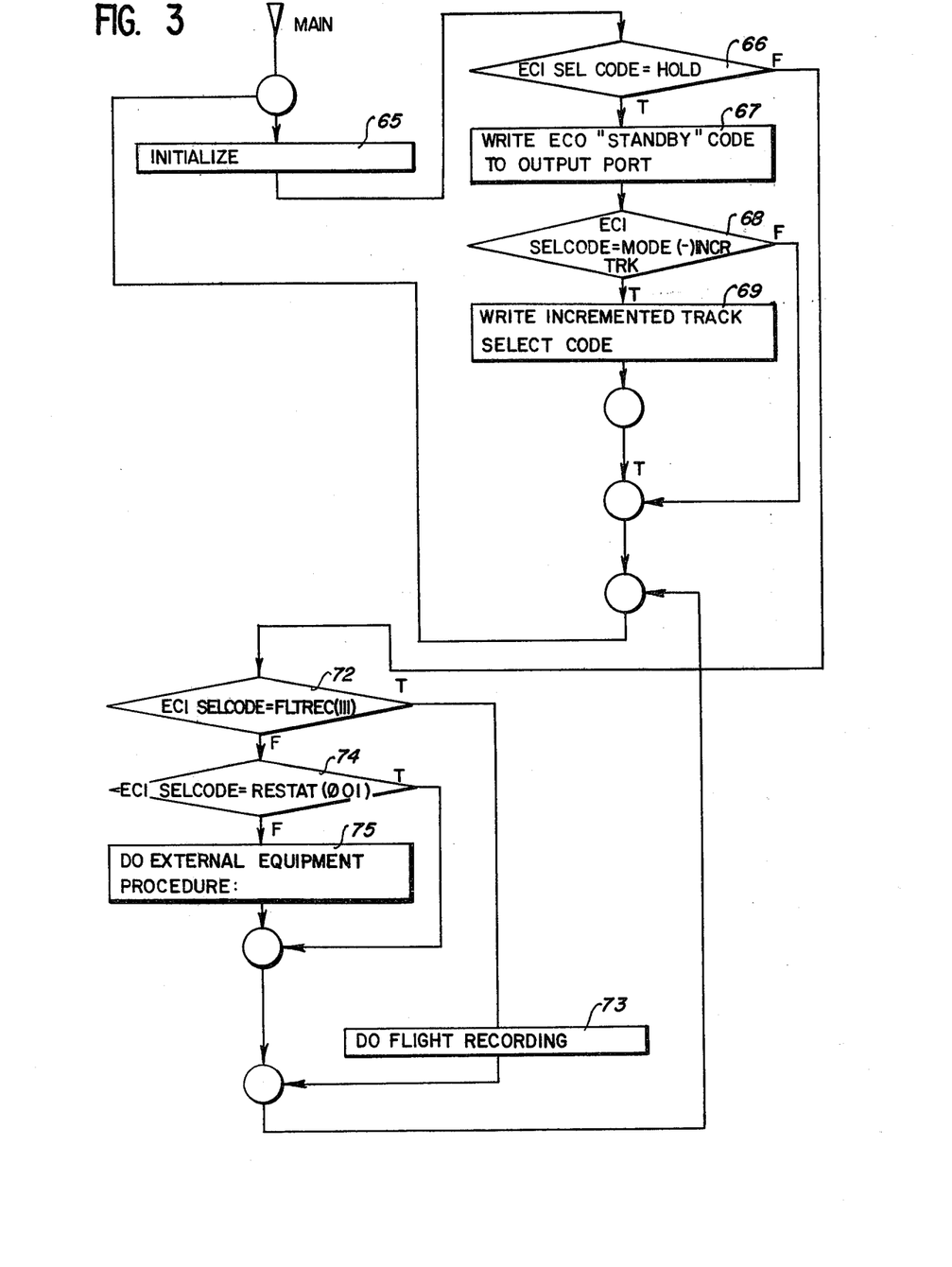

Executive functions of the CPU program are illustrated in the MAIN module, FIG. 3. At step 65 the various systems are initialized. At step 66 the external control input selection code is checked. If it indicates hold or standby, the program writes a standby code to an output port at step 67 and checks for a track increment command at step 68. When a track increment is called for, the appropriate track code is written at 69 and the program returns to initialize, step 65. If a track increment is not called for at step 68, step 69 is by-passed. At step 66, if a hold is not required, the program proceeds to step 72, where a determination is made whether the flight record mode is selected. If the external control input indicates flight record, the program proceeds to the flight recording procedures at step 73 and then returns to initialize step 65.

Figure 4A:
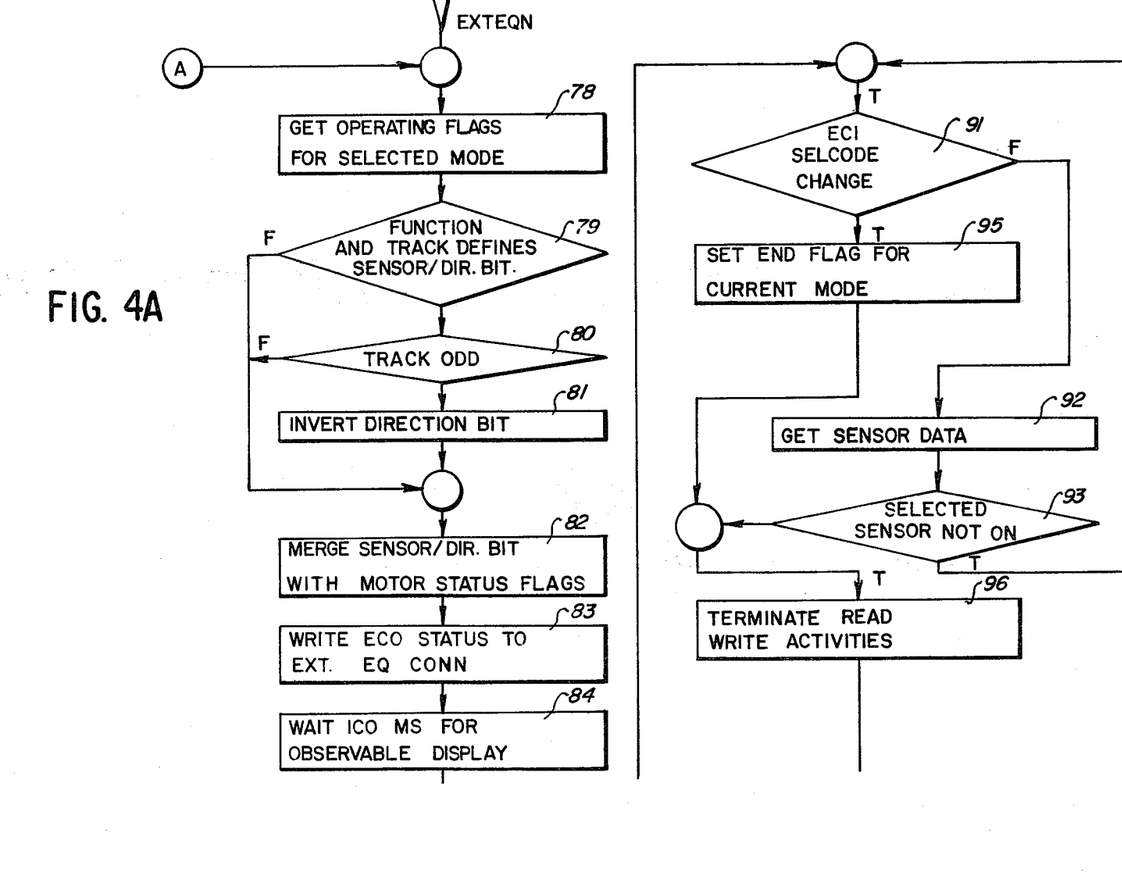
Figure 4B:
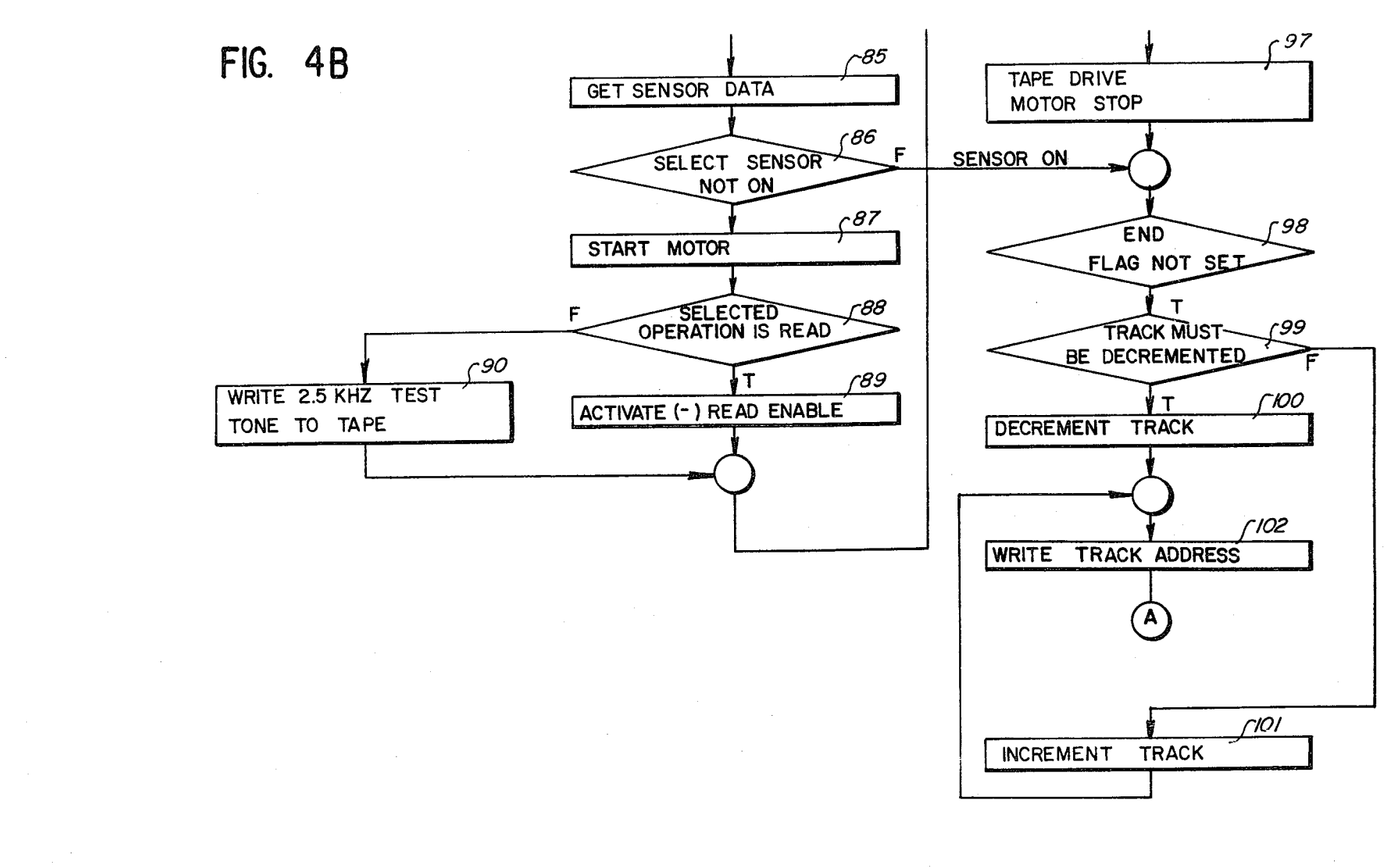

In the absence of a flight record control input, step 74 checks for a restart code. Its presence also causes a return to initialize step 65. Absence of the restart code indicates by a process of elimination that a retrieval apparatus or other external equipment function is to be performed at step 75. This is described in connection with FIG. 4.

The external equipment procedure responds to the external control input (ECI) code by obtaining from a memory table operating flags for the selected operating mode, step 73. The ECI code is established by the retrieval equipment coupled to output connector 36 and the operator function control selection. At step 79 if the selected function defines the EOT/BOT sensor and track direction (any operating mode other than fast forward or rewind) the track address is checked to determine whether the track is even or oddd, step 80. If the track is odd, the sensor and direction bit is inverted, step 81. Otherwise, no change is made. At step 79, if the function and track do not define the sensor and direction bit, steps 80, 81 are omitted. At step 82 the sensor and direction bits are merted with the tape drive motor status flags to establish a condition for proper motor operation. External control status is written to the external equipment connector at step 83 to provide a display to the operator regarding the system condition. A delay at step 84 affords the operator an opportunity to observe the display and to verify that the operation is correct.

The EOT/BOT sensor data is checked at step 85. This procedure will be further described in connection with FIG. 5. At step 86 a check is made to determine whether the selected sensor is on. If it is not on, a tape drive procedure is performed to reach the selected sensor.

The tape drive motor is started at step 87. Step 88 determines whether the selected operation is read. If it is, transducer 19, switches 18 and 28 and amplifier 35 are enabled at step 89. If read is not selected, a writing test is indicated. A test tone is generated and directed to transducer 19 through switch 18 at step 90.

A check is then made at step 91 to determine whether an ECI code change has occurred. If it has not, the tape sensor data is again examined at step 92. If the selected sensor is not on, step 93, the program continues in a loop through steps 91, 92 until a code change occurs on the selected sensor is on. With a code change a flag for the end of the current mode is set at step 95. After this, or if the selected sensor is on, at step 93, the program proceeds to step 96 where the read/write activity is terminated by clearing a read/write enable bit. At step 97 the tape drive motor is stopped. This terminates the tape drive procedure which was initiated when the selected sensor was found to be off at step 86.

At step 98 the program end flag is checked. If it is set, the program is completed and control returns to the main program, FIG. 3. If the flag is not set, the tape track must be changed. At step 99, it is determined whether the track is to be incremented or decremented and the appropriate change is made at steps 100, 101. The new track address is written at step 102 and the program returns to step 78 through terminal A.

Figure 5:
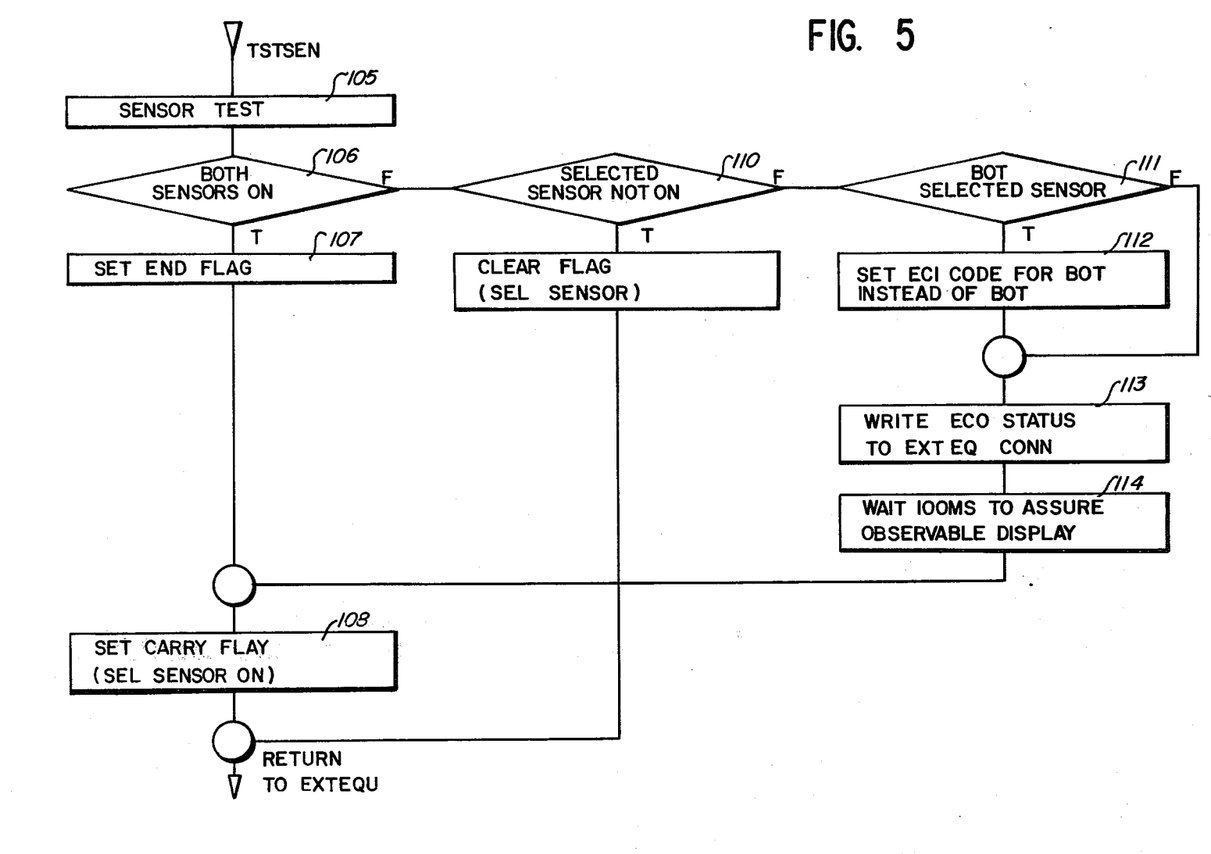

The program for EOT/BOT, steps 85 and 92, is illustrated in FIG. 5. Data from sensors 25, 26 is secured and checked for validity at step 105. If both sensors are on at step 106, an end of examination flag is set at 107 and a selected sensor on flag is set at 108. The program then returns to the appropriate point in the program of FIG. 4.

If both sensors are not on, a determination is made at step 110 whether the selected sensor is on. If it is not, the selected sensor flag is cleared and the program returns to FIG. 4. If the selected sensor is on, step 111 determines whether BOT is the selected sensor. If it is, the BOT code for the external control input is set at 112 (the EOT code being otherwise set). This information is written to the external equipment connector at steps 113, 114, to provide an operator display as described above in connection with steps 83, 84. The program then proceeds to step 108 and returns to the appropriate point in the program of FIG. 4.

The foregoing programs are designed particularly for the data retrieval devices described in connection with FIG. 1. Other recorders and other data retrieval devices may require modification of the programs.

I claim:

1. In a digital tape recorder having a read/write transducer and drive means for moving a recording tape with respect to said transducer for reading data from the tape to be received by one of a plurality of retrieval devices selectably connectable with the recorder, an improved data handling and control means comprising:
   means for generating an identifying control input signal for each of the retrieval devices;
   a data output connector for selectable connection of a retrieval device with the recorder, the control input signal for said connected retrieval device being coupled to the recorder through said connector, and data read from the tape by said transducer being received by said selected retrieval device through said connector;
   a microprocessor control for selecting tape drive and data transmission conditions in accordance with said control input signal for operation compatible with said connected retrieval device;
   means responsive to the microprocessor control for operating said tape drive and transducer to read the data recorded on the tape and direct it to the data output connector in accordance with said control input signal;
   means included in said microprocessor control for monitoring the operating conditions;
   means for providing a status indication of operating conditions from the microprocessor to the data output connector; and
   means for displaying said status indication for verification of the operation.

2. In a digital tape recorder having a read/write transducer and drive means for moving a recording tape with respect to said transducer for reading data from the tape to be received by one of a plurality of retrieval devices selectably connectable with the recorder, an improved data handling and control means comprising:
   means for generating an indentifying control input signal for each of the retrieval devices;
   a data output connector for selectable connection of a retrieval device with the recorder, the control input signal for said connected retrieval device being coupled to the recorder through said connector and data read from the tape by said transducer being received by said selected retrieval device through said connector;
   a microprocessor control for selecting tape drive and data transmission conditions in accordance with said control input signal for operation compatible with said connected retrieval device;
   means responsive to the microprocessor control for operating said tape drive and transducer to read the data recorded on the tape and direct it to the data output connector in accordance with said control input signal; and
   means for detecting the beginning and the end of the tape, the microprocessor in accordance with the control input signal, selecting a forward direction tape drive to the end of the tape or a reverse direction tape drive to the beginning of the tape wherein data is received from the tape in either a forward or reverse direction.

3. In a digital tape recorder having a read/write transducer and drive means for moving a recording tape with respect to said transducer for reading data from the tape to be received by one of a plurality of retrieval devices selectably connectable with the recorder, an improved data handling and control means comprising:
   means for generating an identifying control input signal for each of the retrieval devices;
   a data output connector for selectable connection of a retrieval device with the recorder, the control input signal for said connected retrieval device being coupled to the recorder through said connector and data read from the tape by said transducer being received by said selected retrieval device through said connector;
   a retrieval device connected with the recorder through the data output connector, said retrieval device receiving only a single track of data which has been recorded on the tape and including means for selecting plural parameters from the recorded information;

a microprocessor control for selecting tape drive and data transmission conditions in accordance with said control input signal for operation compatible with said connected retrieval device;

means responsive to the microprocessor control for operating said tape drive and read transducer to direct a single track of data to the data output connector in accordance with said control input signal.

4. In a digital tape recorder having a read/write transducer and drive means for moving a recording tape with respect to said transducer for reading data from the tape to be received by one of a plurality of retrieval devices selectably connectable with the recorder, an improved data handling and control means comprising:

means for generating an identifying control input signal for each of the retrieval devices;

a data output connector for selectable connection of a retrieval device with the recorder, the control input signal for said connected retrieval device being coupled to the recorder through said connector and data read from the tape by said transducer being received by said selected retrieval device through said connector;

a retrieval device connected with the recorder through the data output connector, said retrieval device receiving only a single track of data which has been recorded on the tape and including means for selecting a single parameter of the recorded information and for displaying it in visual form;

a mircroprocessor control for selecting tape drive and data transmission conditions in accordance with said control input signal for operation compatible with said connected retrieval device;

means responsive to the microprocessor control for operating said tape drive and read transducer to direct a single track of data to the data output connector in accordance with said control input signal.

5. The method of operating a digital data tape recorder having a microprocessor control, a read/write transducer, a data buffer for receiving data to be recorded on tape, drive means for moving a recording tape having multiple tracks with respect to said transducer for recording data from the buffer onto the tape and for reading data from the tape to be received by one of a plurality of retrieval devices selectably connectable with the recorder, means for detecting the beginning of the tape and means for detecting the end of the tape, comprising:

operating said transducer and drive means in accordance with a first program of the microprocessor during the recording of data from the data buffer onto the tape, said first program including:

directing data to said data buffer;

moving said recording tape with respect to said transducer in either a first or second direction;

directing data from said buffer to said transducer for recording data on the tape;

verifying data recorded on the tape;

detecting the end of the tape;

incrementing the tape track in reponse to the detection of the end of the tape; and erasing a section of the tape after incrementing said tape track and while data continues to be directed to said data buffer;

providing a control input signal for identifying the connected retrieval device;

operating said transducer and drive means in accordance with a second program of the microprocessor during the retrieval of data from the tape output to said connected retrieval device, said second program including a plurality of subprograms, one of said subprograms being selected in response to the control input signal for said connected retrieval device, said second program and the selected subprogram including:

selecting either the beginning of tape detecting means or the end of tape detecting means;

moving said recording tape with respect to said transducer in a first direction towards the selected detecting means;

moving said recording tape with respect to said transducer in a second direction opposite of the first direction;

reading data from said recording tape during continuous movement of the tape in said second direction; and directing data read from said tape to the connected retrieval device.

* * * * *